United States Patent
Kwan et al.

(10) Patent No.: US 10,270,724 B2
(45) Date of Patent: *Apr. 23, 2019

(54) METHODS AND SYSTEMS FOR PROCESSING MESSAGES AT A MULTI-SIM NETWORK NODE

(71) Applicant: Pismo Labs Technology Limited, Hong Kong (HK)

(72) Inventors: Man Kit Kwan, Hong Kong (HK); Kenneth Kai Kut Yip, Hong Kong (HK); Wan Chun Leung, Hong Kong (HK)

(73) Assignee: PISMO LABS TECHNOLOGY LIMITED, Hong Kong (HK)

(*) Notice: Subject to any disclaimer, the term of this patent is extended or adjusted under 35 U.S.C. 154(b) by 1 day.

This patent is subject to a terminal disclaimer.

(21) Appl. No.: 15/641,218

(22) Filed: Jul. 4, 2017

(65) Prior Publication Data

US 2017/0302605 A1 Oct. 19, 2017

Related U.S. Application Data

(63) Continuation-in-part of application No. 14/425,053, filed on Mar. 2, 2015, now Pat. No. 9,699,627.

(51) Int. Cl.
*H04L 12/58* (2006.01)
*H04W 4/12* (2009.01)
*H04W 4/14* (2009.01)

(52) U.S. Cl.
CPC ............. *H04L 51/12* (2013.01); *H04L 51/14* (2013.01); *H04W 4/12* (2013.01)

(58) Field of Classification Search
CPC ......... H04W 12/06; H04W 4/12; H04W 4/14; H04W 48/06; H04W 4/001; H04W 8/183; H04W 88/184; H04W 92/10; H04L 45/42; H04L 45/00; H04L 45/44; H04L 51/14; H04L 51/28; H04L 29/12188; H04L 45/304; H04L 61/10; H04L 67/2814

See application file for complete search history.

(56) References Cited

U.S. PATENT DOCUMENTS

| | | | | |
|---|---|---|---|---|
| 2011/0312284 A1* | 12/2011 | Falk | ........................ | H04B 7/04 455/68 |
| 2013/0012185 A1* | 1/2013 | Lavi | .................. | H04M 1/72525 455/418 |
| 2014/0302811 A1* | 10/2014 | Chen | .................... | H04W 72/048 455/405 |

* cited by examiner

*Primary Examiner* — Liton Miah
(74) *Attorney, Agent, or Firm* — Hershkovitz & Associates, PLLC; Abe Hershkovitz

(57) ABSTRACT

The present invention discloses a method for processing messages at a network node, wherein the network node has a plurality of SIM card slots. The network node first receives a message and determines whether the message matches any predefined pattern by performing a lookup on the first configuration database. If the message matches any predefined pattern, the network node processes the message. Alternatively, when the message is forwarded to a management server.

16 Claims, 13 Drawing Sheets

METHODS AND SYSTEMS FOR PROCESSING MESSAGES AT A MULTI-SIM NETWORK NODE

RELATED APPLICATION

The present application is a Non-provisional Continuation-in-part application which claims the benefits of and is based on Non-provisional application Ser. No. 14/425,053 titled "METHODS AND SYSTEMS FOR PROCESSING MESSAGES AT A NETWORK NODE" filed on 2 Mar. 2015.

TECHNICAL FIELD

The present invention relates in general to the field of computer networks. More particularly, the present invention relates to methods and systems for processing messages received at a network node.

BACKGROUND ART

Various types of messages, such as notification messages, promotional messages, verification messages, or personal messages may be received at a phone number associated with a SIM card. When the SIM card is inserted in cellular modem of network devices, such as routers and gateways, the network devices may not know how to process the messages. When some messages, such as notification messages about exceeding bandwidth cap, network maintenance, or other messages are received from a service provider, the administrator may need to perform some configuration changes in the network device. As an administrator may need to handle many network devices, it may be troublesome for the administrator to read each and every message and manually configure the network devices according to the messages. However, the user or administrator of the network devices may want to read messages like personal messages or promotional messages. The same may be applicable for email messages. A method is required for processing messages and automatically configuring network devices without human intervention if the messages are related to configuration of the network device, and forwarding messages to the administrator if the messages cannot be processed.

DISCLOSURE OF INVENTION

Summary

The present invention discloses a method for processing messages received at a network node. The network node does not have any hardware components for displaying messages. When the network node receives a message, the network node determines whether the message matches any predefined pattern by performing a lookup on a first configuration database. The network node processes the message if the message matches any predefined pattern. The network node does not process the message if the message does not match any predefined pattern.

In one embodiment, the message is processed by the network node if the message is received from a recognized phone number.

According to one of the embodiments of the present invention, if the message does not match any predefined pattern, the network node may further forward the message to a management server. The network node may then receive an instruction from the management server, and perform configuration at the network node according to the instruction if the instruction is to perform the configuration. In one embodiment, the instruction is to process the message if the message is recognized by the management server.

According to one of the embodiments of the present invention, the first configuration database is updated after receiving information from the management server. The first configuration database comprises a plurality of predefined patterns and a plurality of configurations corresponding to the plurality of predefined patterns. According to one of the embodiments of the present invention, the predefined patterns comprise one or more of a sender phone number, text, number, image, audio, and video.

The message is a short messaging service (SMS) message, a multimedia messaging service (MMS) message, or an email message.

The present invention further discloses a system for processing messages received at the network node. The system comprises at least one network node, at least one interconnected network, and at least one management server. The management server receives a message from the network node, and determines whether the message matches any predefined pattern by performing a lookup on a second configuration database. If the message matches any predefined pattern in the second configuration database, the management server processes the message and sends an instruction to the network node to perform configuration at the network node. Alternatively, when the message does not match any predefined pattern in the second configuration database, the management server does not process the message and sends an instruction to the network node for ignoring the message.

According to one of the embodiments of the present invention, management server processes the message if the message is originated from a recognized phone number.

According to one of the embodiments of the present invention, when the message does not match any predefined pattern in the second configuration database the management server forwards the message to an administrator of the network node. Alternatively, the management server may also instruct the network node to forward the message to the administrator, and thus the network node forwards the message to the administrator.

According to one of the embodiments of the present invention, the second configuration database, is used for updating the first configuration database, wherein the second configuration database is stored in the management server and the first configuration database is stored in the network node.

DETAILED DESCRIPTION

Figure 1:
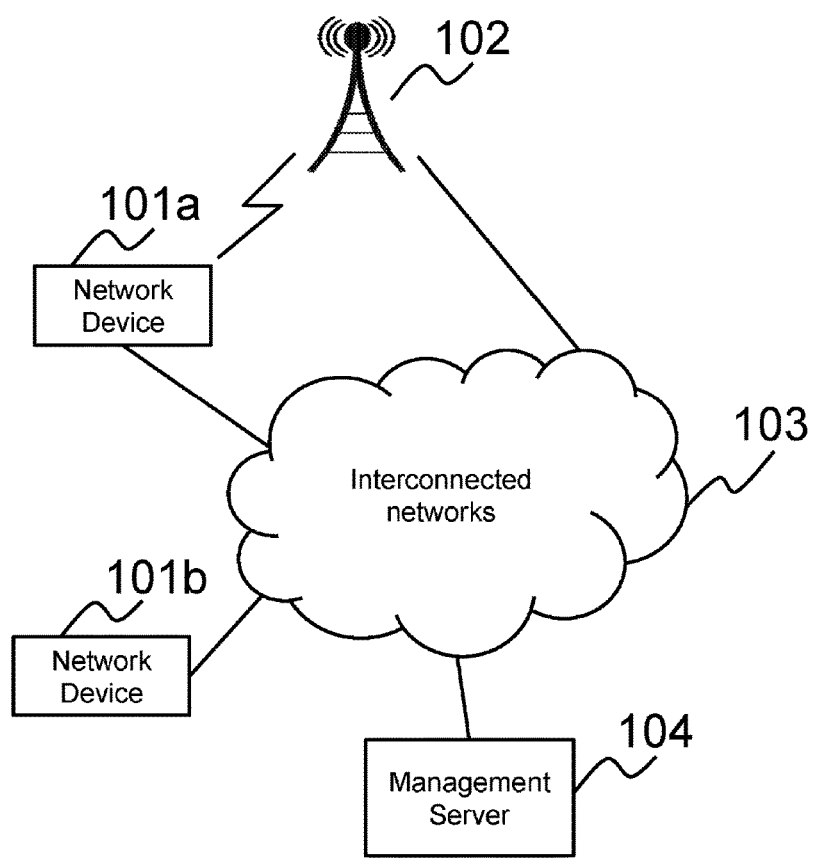
FIG. 1 illustrates an exemplary network environment according to various embodiments of the present invention.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a storage medium.

The program instructions making up the various embodiments may be stored in a storage medium. Moreover, as disclosed herein, the term "storage medium" may represent one or more devices for storing data, including read only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine readable mediums for storing information. The term "machine-readable medium" includes, but is not limited to portable or fixed storage devices, optical storage mediums, magnetic mediums, memory chips or cartridges, wireless channels and various other mediums capable of storing, containing or carrying instruction(s) and/or data. A machine-readable medium can be realized by virtualization, and can be a virtual machine readable medium including a virtual machine readable medium in a cloud-based instance.

The term computer-readable medium, main memory, or secondary storage, as used herein refers to any medium that participates in providing instructions to a processing unit for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics. Transmission media can also take the form of acoustic or light waves, such as those generated during radio-wave and infra-red data communications.

A volatile storage may be used for storing temporary variables or other intermediate information during execution of instructions by a processing unit. A non-volatile storage or static storage may be used for storing static information and instructions for processor, as well as various system configuration parameters.

The storage medium may include a number of software modules that may be implemented as software code to be executed by the processing unit using any suitable computer instruction type. The software code may be stored as a series of instructions or commands, or as a program in the storage medium.

Various forms of computer readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs the one or more sequences of one or more instructions.

A processing unit may be a microprocessor, a microcontroller, a digital signal processor (DSP), any combination of those devices, or any other circuitry configured to process information.

A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware or microcode, the program instructions to perform the necessary tasks may be stored in a computer readable storage medium. A processing unit(s) can be realized by virtualization, and can be a virtual processing unit(s) including a virtual processing unit in a cloud-based instance.

Embodiments of the present invention are related to the use of a computer system for implementing the techniques described herein. In an embodiment, the inventive processing units may reside on a machine such as a computer platform. According to one embodiment of the invention, the techniques described herein are performed by computer system in response to the processing unit executing one or more sequences of one or more instructions contained in the volatile memory. Such instructions may be read into the volatile memory from another computer-readable medium. Execution of the sequences of instructions contained in the volatile memory causes the processing unit to perform the process steps described herein. In alternative embodiments, hard-wired circuitry may be used in place of or in combination with software instructions to implement the invention. Thus, embodiments of the invention are not limited to any specific combination of hardware circuitry and software.

A code segment, such as program instructions, may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Alternatively, hardwired circuitry may be used in place of, or in combination with, software instructions to implement processes consistent with the principles of the invention. Thus, implementations consistent with principles of the invention are not limited to any specific combination of hardware circuitry and software.

A network interface that may be provided by a node is an Ethernet interface, a frame relay interface, a fibre optic interface, a cable interface, a DSL interface, a token ring interface, a serial bus interface, an universal serial bus (USB) interface, Firewire interface, Peripheral Component Interconnect (PCI) interface, etc.

A network interface may be implemented by a standalone electronic component or may be integrated with other electronic components. A network interface may have no network connection or at least one network connection depending on the configuration. A network interface may be an Ethernet interface, a frame relay interface, a fibre optic interface, a cable interface, a Digital Subscriber Line (DSL) interface, a token ring interface, a serial bus interface, a universal serial bus (USB) interface, Firewire interface, Peripheral Component Interconnect (PCI) interface, cellular network interface, etc.

A network interface may connect to a wired or wireless access network. An access network may carry one or more network protocol data. A wired access network may be implemented using Ethernet, fiber optic, cable, DSL, frame relay, token ring, serial bus, USB, Firewire, PCI, or any material that can pass information. An wireless access network may be implemented using infra-red, High-Speed Packet Access (HSPA), HSPA+, Long Term Evolution (LTE), WiMax, General packet radio service (GPRS), Global System for Mobile Communications (GSM), Enhanced Data rates for GSM Evolution (EDGE), Code division multiple access (CDMA), WiFi, CDMA2000, Wideband CDMA (WCDMA), Time Division CDMA (TD-SCDMA), BLUETOOTH, WiBRO, Evolution-Data Optimized (EV-DO); Digital Enhanced Cordless Telecommunications (DECT); Digital AMPS (IS-136/TDMA); Integrated Digital Enhanced (iDEN) or any other wireless technologies. For example, a network interface may be used as a local area network (LAN) interface or a wide area network (WAN) interface Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, local area network (LAN), metropolitan area network (MAN), wide area network (WAN), the PSTN, a satellite communication system, a cable transmission system, and/or the like.

FIG. 1 illustrates an exemplary network environment according to various embodiments of the present invention. Network device 101a connects to interconnected networks 103 through one or more network interfaces. Network device 101a also connects to a cellular network 102, and connects to interconnected networks 103 through cellular network 102. In one variant, a management server, such as management server 104, is connected to interconnected networks 103. Management server 104 is used to manage hosts or nodes remotely. For example, user or administrator of network devices 101a and/or 101b may manage network devices 101a and/or 101b through management server 104. Management server 104 can be a router, a gateway, a network node, a server, a desktop, a laptop, a mobile device or any electronic device that may store information related to a node and through which a node can be managed. Management server 104 can be located in the same network of nodes or terminals or can be located in a remote network. A user or administrator may access management server 104 using a terminal. A terminal may be used to access management server 104 directly through interconnected networks 103 or through a node such as network devices 101a and 101b.

Figure 2A:
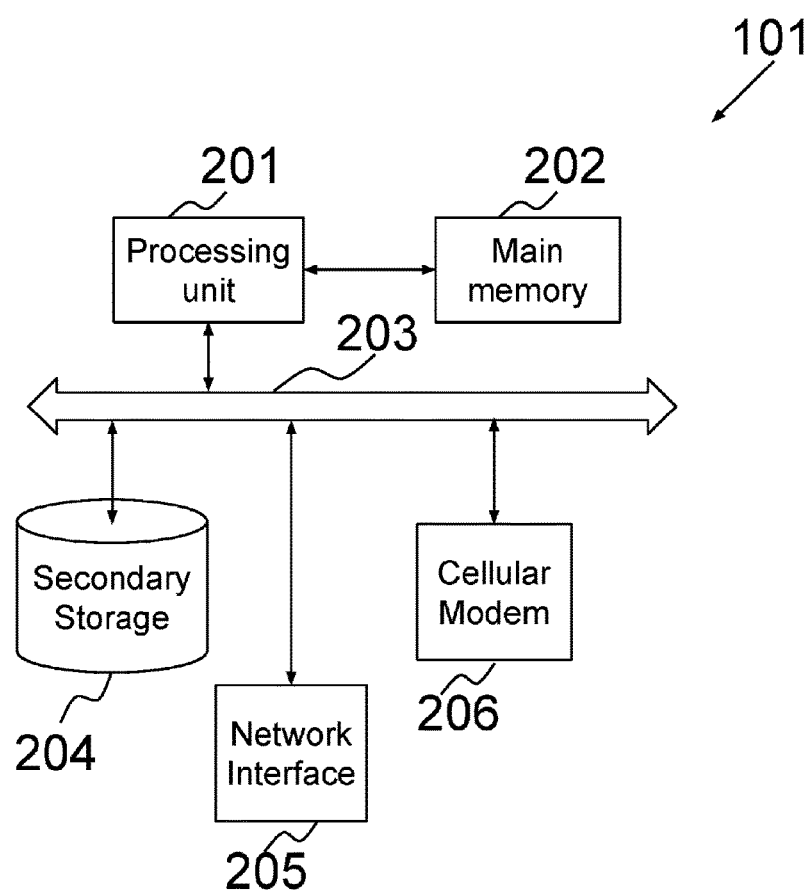
FIG. 2A illustrates a block diagram of a network device according to one of the embodiments of the present invention.

FIG. 2A illustrates a block diagram of a network device according to one of the embodiments of the present invention. Network device 101a can be a network node or network host that provides network functionalities or have networking capabilities respectively. For example, network device 101a can be a router, a hub, a gateway, an IEEE 802.11 access point, a database server, a web server, a virtualized router, a laptop, a computer, a smart-phone, a tablet and etc. Network device 101a comprises processing unit 201, main memory 202, secondary storage 204, system bus 203, network interface 205, and cellular modem 206. Processing unit 201 and main memory 202 are connected to each other directly. System bus 203 connects processing unit 201 directly or indirectly to secondary storage 204, network interface 205, and cellular modem 206. Using system bus 203 allows network device 101a to have increased modularity. System bus 203 couples processing unit 201 to secondary storage 204, network interface 205 and cellular modem 206. System bus 203 can be any of several types of bus structures including a memory bus, a peripheral bus, and a local bus using any of a variety of bus architectures. Secondary storage 204 stores program instructions for execution by processing unit 201.

There is no limitation as to how many network interface 205 network device 101a can have. Network device 101a can have no network interface, one or more network interfaces. When network device 101a has no network interface, it communicates through cellular modem 206. In one variant, network interface 205 is also capable of being used for cellular communications if it has such capabilities built-in or if it is connected to an external cellular modem.

Network device 101a has access to at least one cellular modem, such as cellular modem 206, for connecting to cellular communications network such as cellular network 102. Cellular modem 206 can be implemented using an embedded cellular modem, an internal cellular modem or an external cellular modem. For example, cellular modem 206 can be Universal Serial Bus (USB) based cellular modem. In one variant, cellular modem 206 is connected to a network interface, such as network interface 205, and hence network device 101a has access to cellular modem 206 through network interface 205. In one variant, cellular modem 206 is connected to network device 101a through a private or public interconnected network such that network device 101a can send and receive SMS messages through cellular modem 206.

Network device 101b may have the same architecture and functionality as network device 101a.

Figure 2B:
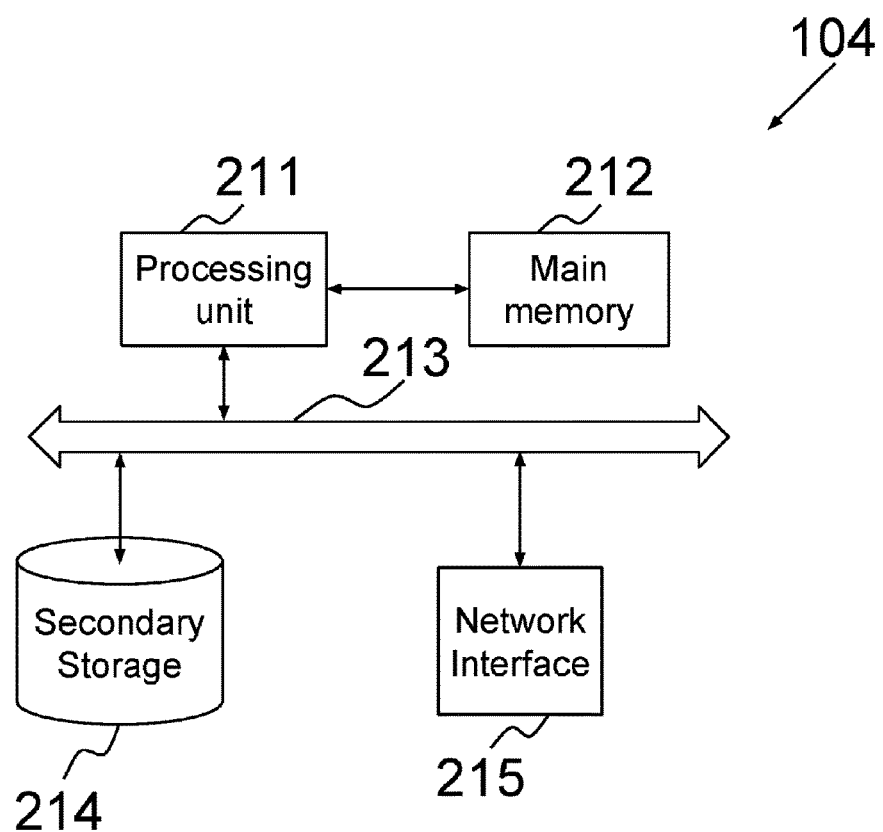
FIG. 2B illustrates a block diagram of a management server according to one of the embodiments of the present invention.

FIG. 2B illustrates a block diagram of a management server, such as management server 104, according to one of the embodiments of the present invention. Management server 104 comprises processing unit 211, main memory 212, secondary storage 214, system bus 213, and network interface 215. Processing unit 211 and main memory 212 are connected to each other directly. System bus 213 connects processing unit 211 directly or indirectly to secondary storage 214 and network interface 215. Using system bus 213 allows management server 104 to have increased modularity. System bus 213 couples processing unit 211 to secondary storage 214 and network interface 215. System bus 213 can be any of several types of bus structures including a memory bus, a peripheral bus, and a local bus using any of a variety of bus architectures. Secondary storage 214 stores program instructions for execution by processing unit 211.

There is no limitation as to how many network interface 215 management server 104 can have, such that management server may have one or a plurality of network interfaces through which it may connect to one or a plurality of networks.

It would be known to those skilled in the arts that a user or administrator of a network device may monitor the network device, such that they are notified at certain events. For example, the events may include a bandwidth cap of a connection approaching, or a usage price of a connection reaching or exceeding a threshold, etc. In some scenarios, when a cellular modem is used with a subscriber identity module (SIM) card, in such events, the service provider of the connection of the cellular modem may send short messaging service (SMS) message to a number associated with the SIM card. Alternatively, the service provider may also send an email message to the user or administrator notifying the user or administrator about such events. The present invention discloses methods and systems for allowing the network device to process the message and perform necessary steps as indicated in the message.

Figure 3:
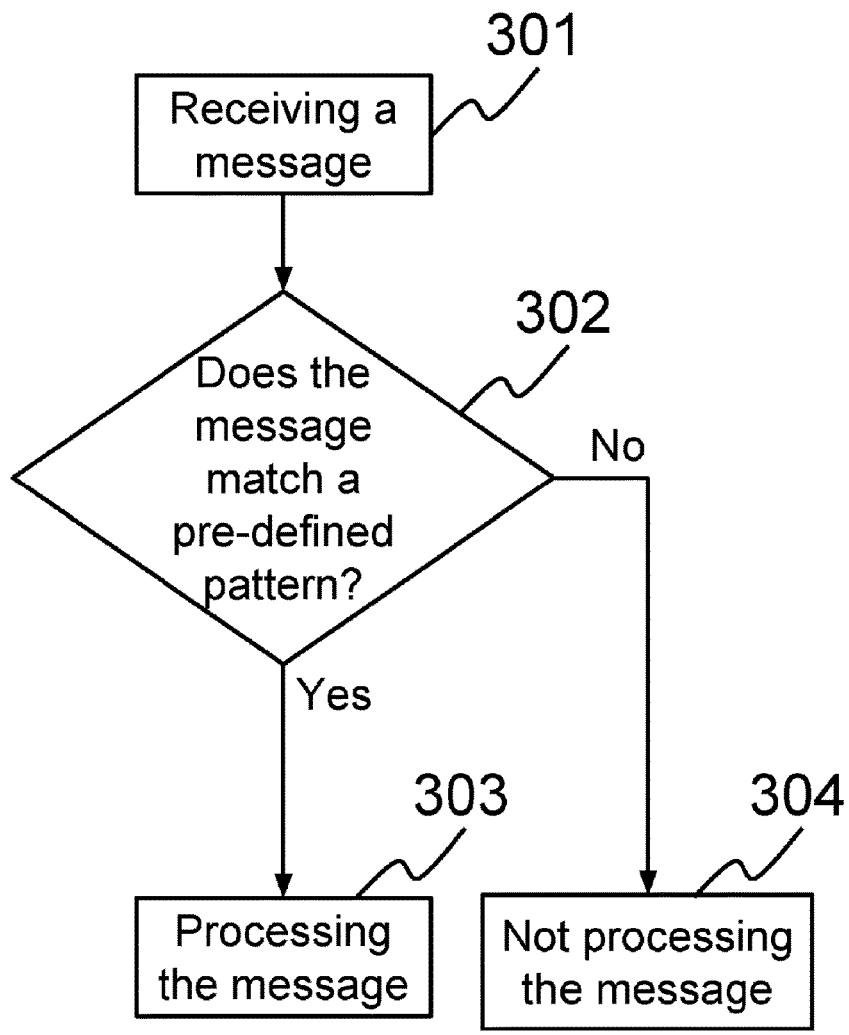
FIG. 3 is a flowchart illustrating a process according to one of the embodiments of the present invention.

FIG. 3 is a flowchart illustrating a process according to one of the embodiments of the present invention. Network device 101a receives a message in step 301, and processing unit 201 determines whether the message matches at least one predefined pattern in step 302. If the message matches the at least one predefined pattern, the message is processed by processing unit 201 in step 303. If the message does not match the at least one predefined pattern, processing unit 201 does not process the message in step 304.

In one variant, when processing unit 201 does not process the message in step 304, the message may be discarded. In another variant, the message may be displayed at a web interface of network device 101a, such that the user or administrator may view the message.

In one of the embodiments of the present invention, the message is a SMS message. For example, a SIM card is inserted in cellular modem 206 of network device 101a. The SIM card is associated with a phone number. Whenever a SMS message is sent to the phone number, network device 101a receives the message and the process of FIG. 3 may be performed. For example, network device 101a may be configured such that it only processes SMS messages received from the service provider. For illustration purpose, the user or administrator can then set the predefined pattern by defining one or more source phone numbers of the SMS message. As the service provider may usually send SMS messages from one or more known phone numbers, the one or more source phone numbers are defined as the one or more known phone numbers. Processing unit 201 then only processes SMS messages which have a source phone number that matches one of the one or more source phone numbers in the predefined pattern. In another example, the predefined pattern may be set by defining character string(s) that should be present in the SMS message. If character string(s) "bandwidth", "data" or character strings including the service provider's name, etc are defined in the predefined pattern, processing unit 201 may only process SMS messages containing at least one of the defined character strings. The user or administrator may define other character string(s), and the scope of the invention is not limited to the character strings mentioned here.

In one of the embodiments of the present invention, the message is a multimedia messaging service (MMS) message. The MMS message may comprise an image, audio, video or a combination of image, audio and/or video. Network device 101a may use image recognition and/or sound recognition techniques to determine whether the MMS message matches any predefined pattern set by the user or administrator. In some scenarios, automated voice messages may be sent by service providers for providing information about data usage, billing, recharging or top-ups. Network device 101a may process such automated voice messages by matching them with predefined patterns and determining corresponding configurations. If the MMS message does not match any predefined pattern and processing unit 201 is unable to process the MMS message, the MMS message may be forwarded to administrator of network device 101a. Alternatively, the MMS message may be forwarded to management server 104 for processing. In one variant, the MMS message is processed only if it comes from a recognizable phone number or source.

In one of the embodiments of the present invention, the message is an email message. Network device 101a may receive email messages sent to one or more email addresses specified by the user or administrator. For example, the administrator configures network device 101a to receive email messages sent to the email address "abc@xyz.com". The administrator can further set a predefined pattern by defining one or more source email addresses. Processing unit 201 then only processes email messages received at abc@xyz.com from the one or more defined source email addresses. As discussed above, the administrator can also set a predefined pattern by defining character string(s) that should be present in the email message. Processing unit 201 may only process email messages that contain the defined character string(s) and hence matches the predefined pattern.

The message may match the predefined pattern if the defined character string(s) are found in one or more of the subject, body, source email address. In one variant, management server 104 may also receive the email messages in addition to network device 101a, or instead of network device 101a. Therefore, management server 104 may perform the processing of the email messages and may then configure network device 101a accordingly.

In another illustration, the administrator may also set a filter for email address "abc@xyz.com", such that only email messages from the one or more defined source email addresses and/or email messages containing the defined character string(s) are forwarded to another email address "def@xyz.com", and network device 101a is configured to process all emails received at def@xyz.com. In this scenario, an email message matches the predefined pattern if it is received at (destined to) def@xyz.com.

When network device 101a determines to process a message, processing unit 201 configures network device 101a according to the content of the message. A configuration database may be stored in secondary storage 204 that comprises configurations corresponding to predefined patterns. When a message matches a predefined pattern, processing unit 201 performs a lookup on the configuration database to determine a configuration corresponding to the predefined pattern, and then configures network device 101a with the determined configuration.

For example, a first entry in the configuration database may comprise a first predefined pattern which indicates that a bandwidth cap of a connection through cellular modem 206 is approaching. A first configuration corresponding to the first predefined pattern is to stop using the connection through cellular modem 206. For illustration purpose, a SIM card inserted in cellular modem 206 is subscribed to a data plan, and a message is received from a service provider. The message comprises information that a data usage limit of the data plan has been reached. Processing unit 201 may then configure network device 101a to stop using cellular modem 206 for receiving or transmitting data and start using another connection, such as a Wi-Fi connection for receiving and transmitting data. Processing unit 201 may further send a notification to a user and/or administrator in order to inform that network device 101a has stopped using the connection through cellular modem 206. In some scenarios, when a data usage limit is exceeded, the usage price may become higher. In order to minimize the usage price, network device 101a may be configured to stop using a connection when a data usage limit has been reached. In one variant, before stopping using cellular modem 206, there is a period of time that the amount of data that can be transmitted through cellular modem 206 is reduced substantially by processing unit 206 comparing to the amount of data normally allowed. This ensures that further cost incurred before stopping the use of cellular modem 206 is limited or not substantial.

A second entry in the configuration database may comprise a second predefined pattern which indicates that a maintenance of a network connected through cellular modem 206 will be carried out at a certain time for a maintenance time period. A second configuration corresponding to the second predefined pattern is to connect to another available network at or before the certain time, and remain connected to the another network for at least the maintenance time period. When processing unit 201 configures network device 101a with the second configuration, network device 101a connects to another available network for the maintenance time period. This may ensure that there is no disruption in the performance of network device 101a due to maintenance of the network, as network device 101a may access interconnected networks 103 through the another network.

A third entry in the configuration database may comprise a third predefined pattern which indicates that a prepaid SIM card inserted in cellular modem 206 needs to be recharged as it is out of credit. A third configuration corresponding to the third predefined pattern is to send a notification to administrator of network device 101a requesting the administrator to recharge or top-up.

A fourth entry in the configuration database may comprise a fourth predefined pattern which indicates that a bill for post-paid connection of a SIM card inserted in cellular modem 206 needs to be paid. A fourth configuration corresponding to the fourth predefined pattern is to send a notification to administrator of network device 101a requesting the administrator to pay the bill.

When messages are received that matches predefined patterns of the first, second, third, fourth or any other entries in the configuration database, they are configured with the corresponding configurations corresponding to the predefined patterns that are defined in the configuration database.

The scope of the invention is not limited to storing only the entries discussed above in the configuration database, such that an administrator may define any custom entries in the configuration database. The above entries are examples provided for better understanding of the embodiments. Furthermore, different configurations may be defined for each predefined pattern, and the configurations are not limited to the ones described above.

In one variant, it is possible that service providers may send one or more verification SMS messages to network device 101a for confirming identity of network device 101a or identity of the administrator of network device 101. A predefined pattern may be included in the configuration database of network device 101a and/or management server 104 that matches with such verification SMS messages. If the verification SMS message asks for a reply SMS message with a particular verification code or the identity, such as MAC address or serial number of network device 101, the corresponding configuration for the predefined pattern may be sent with a SMS message comprising the required particular verification code or the identity to a specific number. Alternatively, network device 101a forwards the verification SMS message to administrator of network device 101a through a web interface, application programming interface (API) or a command line interface.

Figure 4:
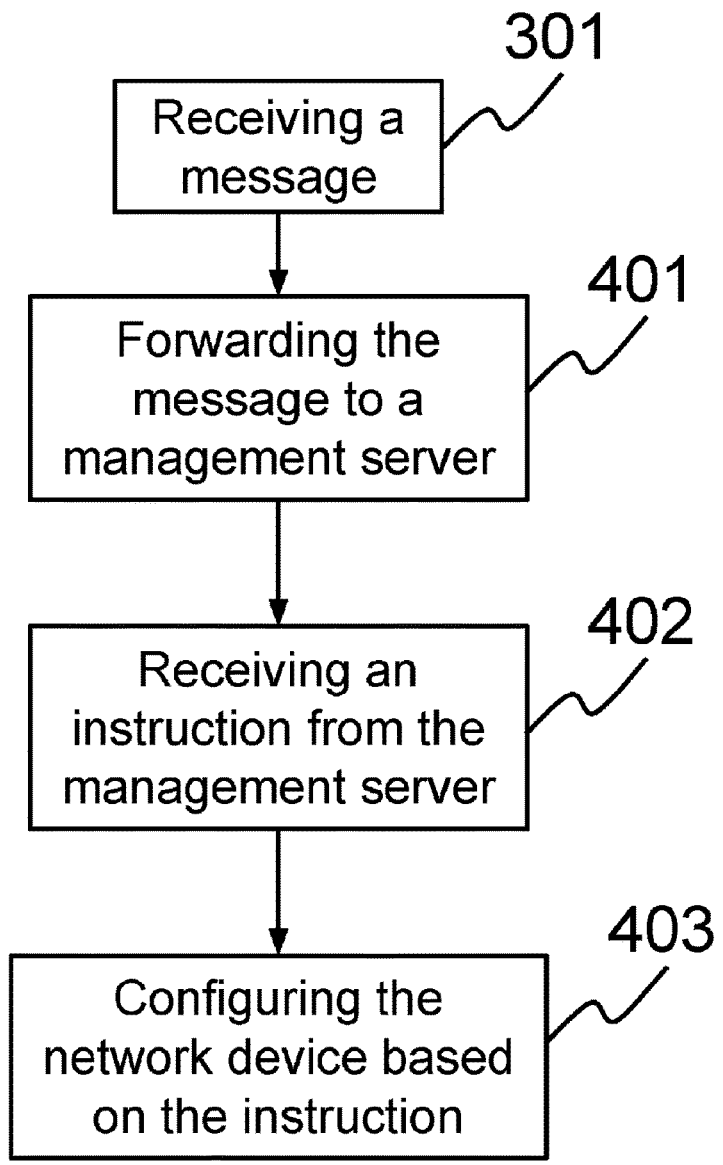
FIG. 4 is a flowchart illustrating a process according to one of the embodiments of the present invention.

FIG. 4 is a flowchart illustrating a process according to one of the embodiments of the present invention. Network device 101a receives a message in step 301. As discussed above, the message may be a SMS message or an email message. Network device 101a forwards the message to management server 104 in step 401. Management server 104 may then process the message and send an instruction to network device 101a accordingly. Network device 101a receives the instruction from management server 104 in step 402. The instruction may comprise a configuration for configuring network device 101a. In step 403, network device 101a is configured according to the instruction received from management server 104.

The difference between the process of FIG. 4 and the process of FIG. 3 is that, in FIG. 4, the message is forwarded to management server 104 for processing, while in FIG. 3, network device 101a itself processes the message.

Management server 104 may manage a plurality of network devices, such as network devices 101a and 101b and may also maintain a configuration database for providing configurations to the plurality of network devices. A configuration database stored in and maintained by management server 104 may be more comprehensive and may comprise more predefined patterns. It is therefore more likely that when the message is forwarded to management server 104, management server 104 will be able to find a predefined pattern that matches with the message in the configuration database stored in management server 104. The configuration message may be stored in a storage medium of management server 104.

Figure 5:
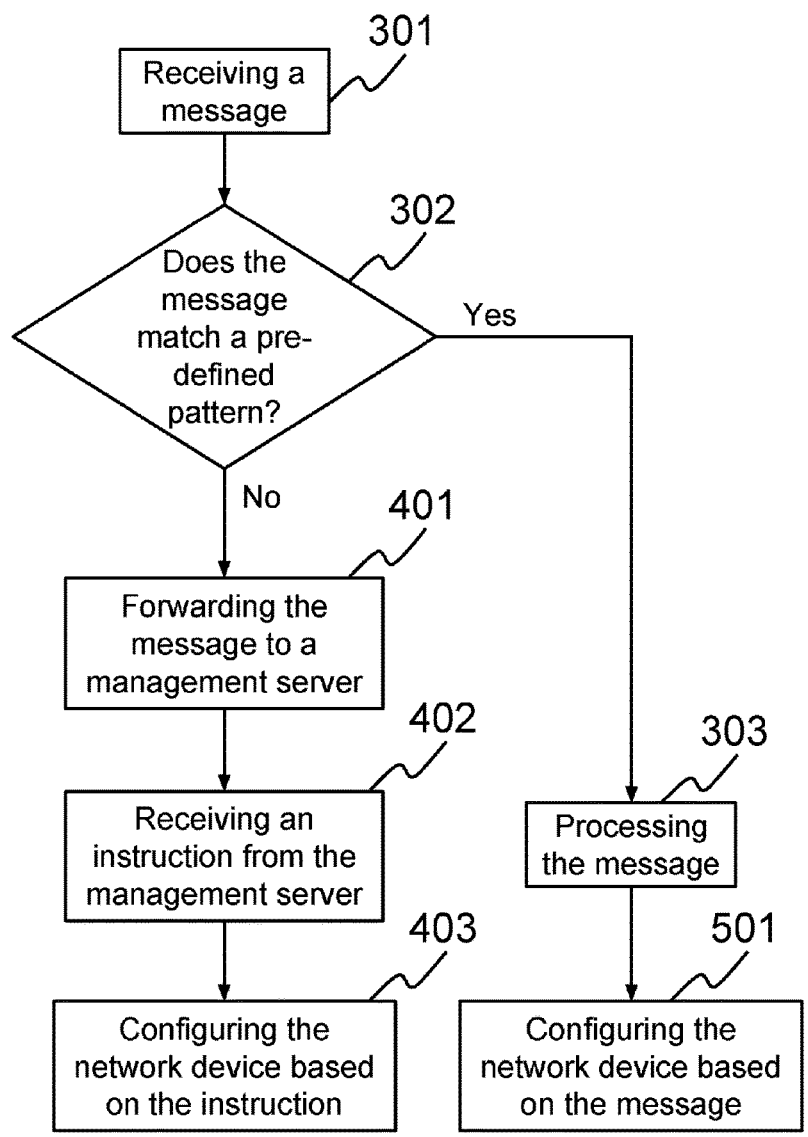
FIG. 5 is a flowchart illustrating a process according to one of the embodiments of the present invention.

FIG. 5 is a flowchart illustrating a process according to one of the embodiments of the present invention. Network device 101a receives a message in step 301 and determines whether the message matches a predefined pattern in step 302. If the message matches the predefined pattern, processing unit 201 processes the message in step 303. Network device 101a is then configured based on the message in step 501. Alternatively, when the message does not match any predefined pattern, network device 101a forwards the message to management server 104 in step 401. Management server 104 may either discard the message or process the message. If management server 104 processes the message, it may send an instruction to network device 101a for configuring network device 101a. The instruction is received at network device 101a in step 402. Network device 101a is then configured in step 403 based on the instruction received from management server 104.

Figure 6:
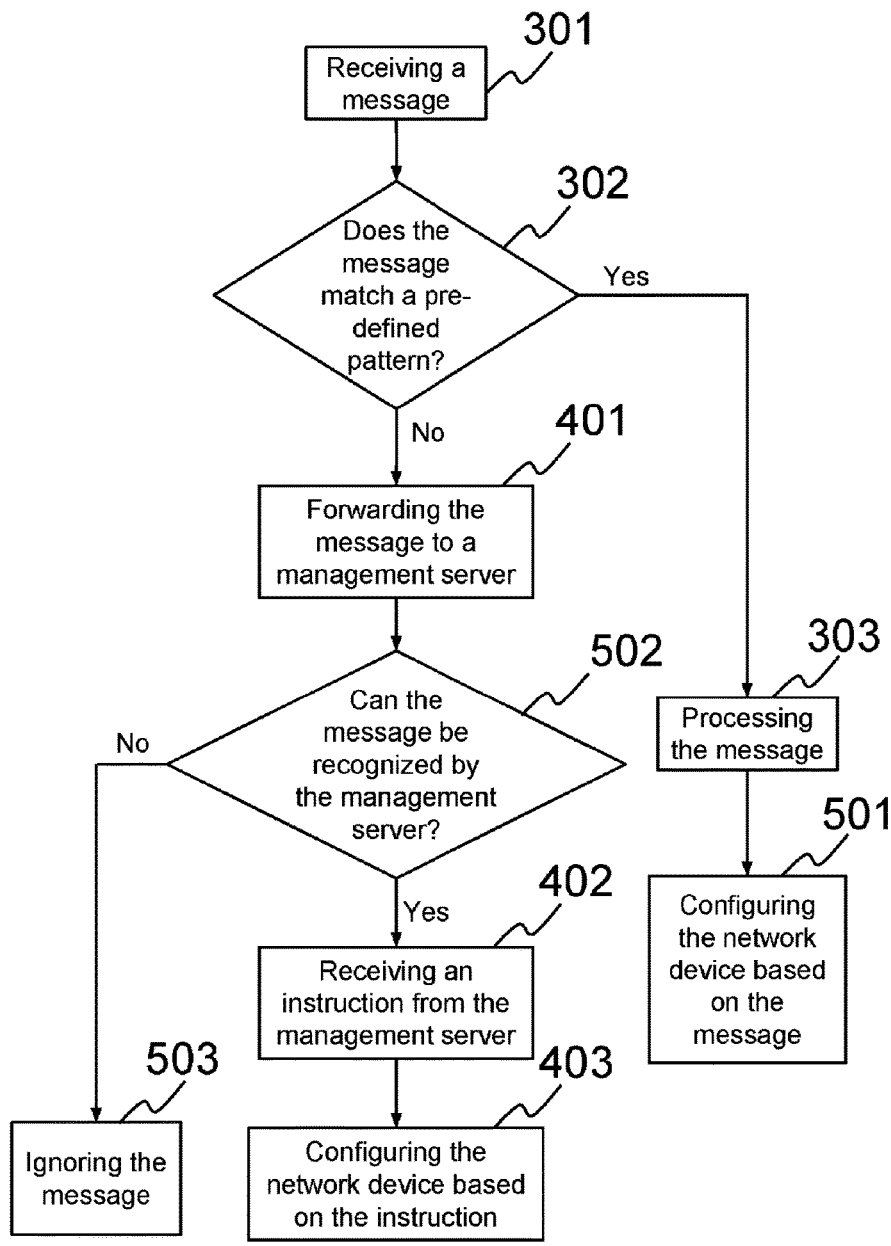
FIG. 6 is a flowchart illustrating a process according to one of the embodiments of the present invention.

FIG. 6 is a flowchart illustrating a process according to one of the embodiments of the present invention. The difference between FIG. 6 and FIG. 5 is that the flowchart of FIG. 6 includes steps 502 and 503. After forwarding the message to management server 104 in step 401, steps 402 and 403 are performed only if the message can be recognized by management server 104 in step 502. The message is said to be recognized by management server 104 when a configuration database of management server 104 comprises a predefined pattern matching the message, and a corresponding configuration. When the message is recognized by management server 104, it can match it with the predefined pattern and send an instruction to network device 101a according to the corresponding configuration, and therefore steps 402 and 403 can be performed. Alternatively, when the configuration database in management server 104 does not comprise any predefined pattern matching the message, management server 104 cannot recognize the message in step 502. Therefore, the message is ignored by network device 101a in step 503.

In one variant, when management server 104 cannot recognize the message, management server 104 forwards the message to an administrator of network device 101a. Management server 104 may further send a notification to network device 101a instructing network device 101a to ignore the message until further instructions from the administrator. In another variant, when management server 104 cannot recognize the message, management server 104 notifies network device 101a that the message could not be recognized, and instructs network device 101a to forward the message to the administrator. After the message is forwarded to the administrator, management server 104 and network device 101a may then ignore the message until further instructions from the administrator.

Figure 7:
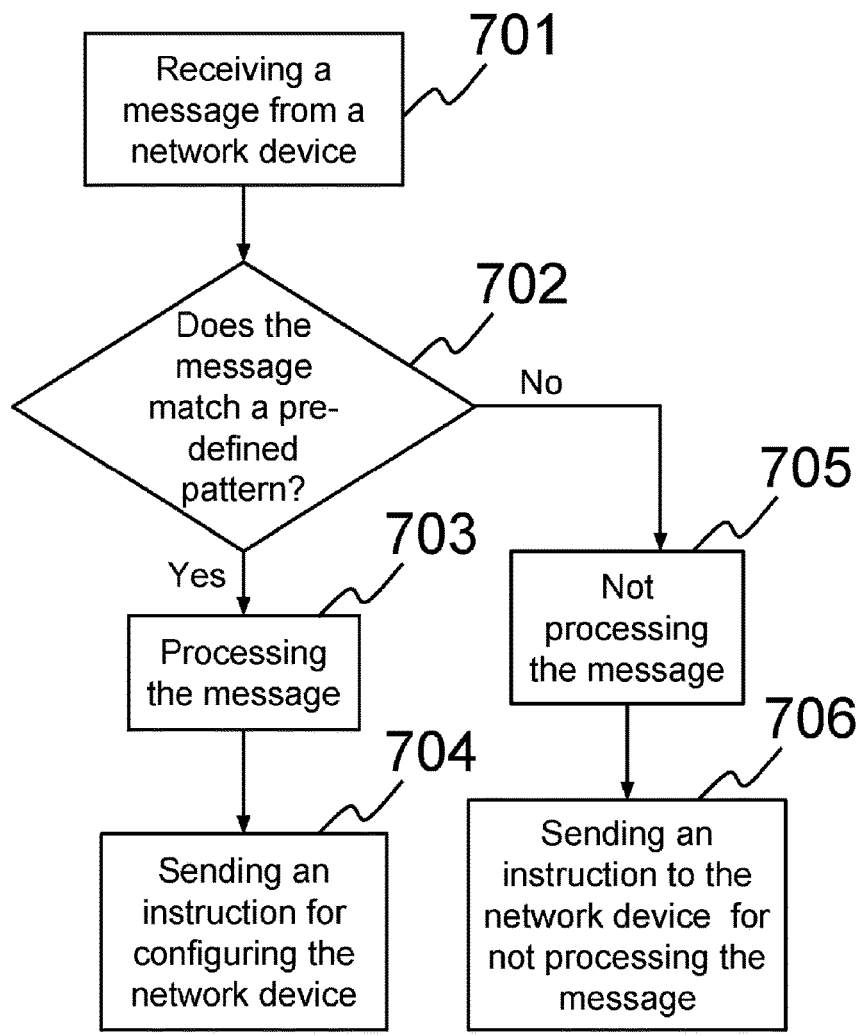
FIG. 7 is a flowchart illustrating a process carried out at a management server according to one of the embodiments of the present invention.

FIG. 7 is a flowchart illustrating a process carried out at management server 104 according to one of the embodiments of the present invention. As seen in FIG. 4 and FIG. 5, network device 101a may forward messages to management server 104. Management server 104 receives the message in step 701. Management server 104 then determines whether the message matches with any predefined pattern in step 702. A lookup may be performed at a configuration database stored in secondary storage 214 of management server 104 in order to determine whether the message matches any predefined pattern. If the message matches a predefined pattern, the message is processed by management server 104 in step 703 and an instruction is sent to network device 101a in step 704 for performing configuration of network device 101a. The instruction may comprise a configuration corresponding to the predefined pattern in the configuration database. Alternatively, if the message does not match any predefined pattern, management server 104 determines not to process the message in step 705. Management server 104 then sends an instruction in step 706 to network device 101a for not processing the message, and ignoring the message until further instructions from an administrator of network device 101a.

In one example, management server 104 determines, in step 702, that the message matches a predefined pattern if the message is originated from a recognized phone number. When management server 104 recognizes the phone number from which the message is originated, management server 104 processes the message in step 703 and sends an instruction to network device 101a in step 704.

Configuration database stored in network device 101a can be updated in various ways. In one variant, administrator of network device 101a sends information of predefined patterns and corresponding configurations to network device 101. Network device 101a then stores the information in the configuration database. The administrator may send the information via various means, such as a web interface, application programming interface (API), command line interface, console, Bluetooth, or USB. The administrator may use a terminal, such as a computer, a mobile phone, or any electronic device that can be used to send information to network device 101. The means for sending information to network device 101a may depend on how the terminal is connected to network device 101. In one example, the administrator may upload information, such as a predefined pattern or a list of predefined patterns and corresponding configurations, through a firmware of network device 101. The information may be in the form of a configuration file, a code, a firmware, or any file that can be used to send the information to network device 101. The information may then be stored in secondary storage 204 of network device 101a and a configuration database is created using the information. When a configuration database already exists, the information sent by the administrator is used to update the configuration database of network device 101. In another example, the administrator may download and install a software for configuring network device 101, and upload the information through the software. In another example, when a predefined pattern is already in the configuration database, its corresponding configuration can be updated. The administrator can send information of the predefined pattern and a new corresponding configuration. An old corresponding configuration is then replaced with the new corresponding configuration, and thus corresponding configuration of the predefined pattern is updated.

Similarly, configuration database of management server 104 may also be updated by an administrator of management server 104 by the methods described above.

In one variant, configuration database of network device 101a is updated by management server 104. As shown in FIG. 5, when network device 101a is unable to find a predefined pattern matching the message, it forwards the message to management server 104 in step 401. Management server 104 may then find a predefined pattern matching the message and corresponding configuration in a configuration database stored in management server 104. When management server 104 sends an instruction for configuring network device 101, the instruction may comprise the predefined pattern that matches the message and its corresponding configuration. Network device 101*a* may then update its configuration database by adding the predefined pattern and its corresponding configuration sent by management server 104. Therefore, if a similar message matching the predefined pattern is received at network device 101*a* in the future, network device 101*a* can configure itself with the corresponding configuration and would not need to forward the message to management server 104.

In one variant, management server 104 updates the configuration database of network device 101*a* by sending information of predefined patterns and corresponding configurations to network device 101*a*. The information sent may be taken from configuration database of management server 104. The information is then used by network device 101*a* for creating or updating the configuration database of network device 101*a*.

It should be noted that unlike mobile phones, the messages received at network device 101*a* are not displayed on the surface of, on the enclosure of or on the screen of network device 101*a*. Network device 101*a* can process messages and configure itself accordingly without human intervention, or forward the messages to administrator for processing. It should be appreciated that even though network device 101*a* may not have a screen for displaying messages received in from service providers, processing unit of network device 101 is capable of processing the messages without human intervention such that necessary actions are taken according to the contents of the message. In one variant, unlike a mobile phone, network device 101*a* is not capable of receiving text input on the surface of, on the enclosure of or on the screen of network device 101*a*.

The embodiments were chosen and described in order to best explain the principles of the invention and its practical applications, to thereby enable others skilled in the art to best utilize the invention and various embodiments with various modifications as are suited to the particular use contemplated.

Figure 8:
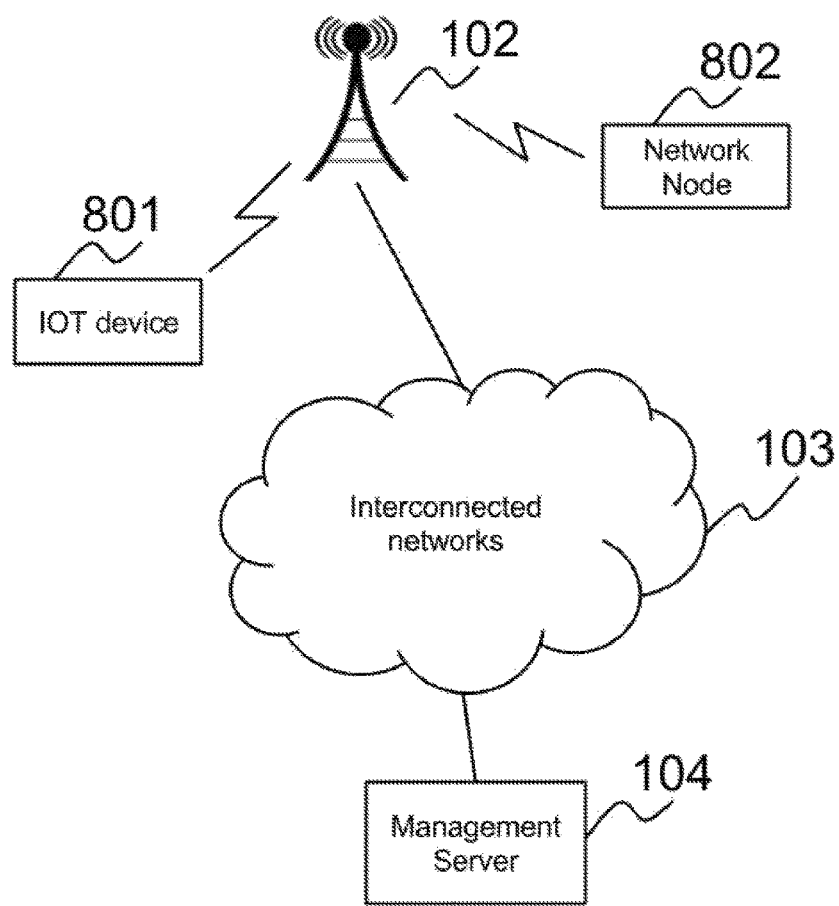
FIG. 8 illustrates an exemplary network environment according to various embodiments of the present invention.

FIG. 8 illustrates an exemplary network environment according to various embodiments of the present invention. Network nodes, such as Internet of Thing (IoT) device 801 and network node 802, connect to interconnected networks 103 through cellular networks, such as cellular network 102. IoT device 801 and network node 802 are capable of receiving wireless messages. The messages received by IoT device 801, for example, may be replies in responses to requests sent by IoT device 802. The messages received by network node 802, for example, may proactively been sent by the wireless service provider that network node 802 connecting to.

IoT device 801 may only have one network interface for connecting to the cellular modem. In one variant, IoT device 801 does not have any local area network (LAN) interface and is only capable to establish data connection with other network nodes and/or servers through its cellular modem.

Figure 9:
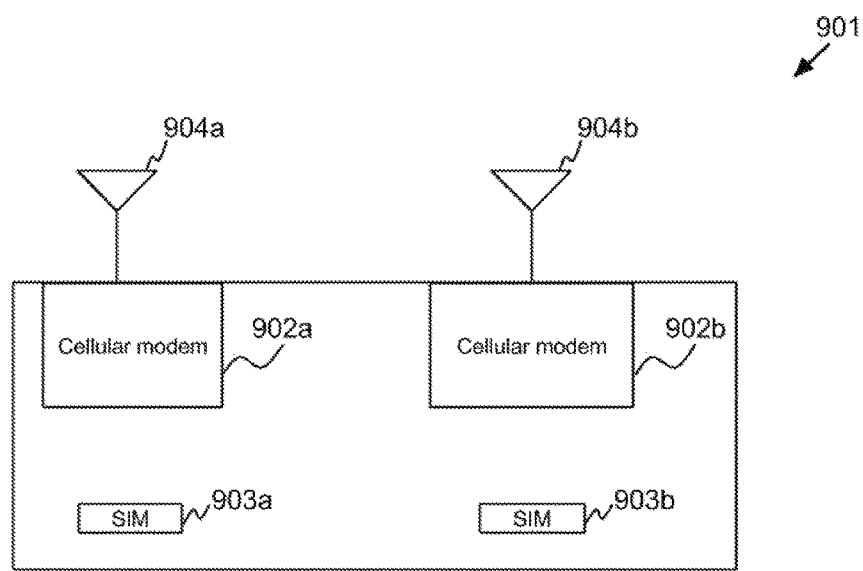
FIG. 9 illustrates a block diagram of a network node according to one of the embodiments of the present invention.

FIG. 9 illustrates network node 901, a particular type of network node that is comprised of a plurality of cellular modems 902, a plurality of SIM card slots 903 and a plurality of antennas 904. For example, IoT device 801 can be network node 901. Network node 901 is also comprised of other electronic components, such as processing unit and computer readable storage medium, that are not shown in FIG. 9. Each of the plurality of cellular modems 902 is connected to at least one antenna and at least one SIM card slot. Network node 901 is capable of using one of, some of or all of the plurality of cellular modems to connect to interconnected networks 103 simultaneously. When network node 901 is not connecting to interconnected networks 103, it is still capable of receiving messages from wireless service providers through one of, some of or all the plurality of cellular modems.

When a message is received, the process will be processed according to the processes described herein. In one example, as cellular modems 902*a* and 902*b* are connecting to same or different wireless service providers using different SIM cards in SIM card slots 903*a* and 903*b* respectively, and predefined patterns associated with each of SIM cards may be the same or different. For example, in order to recognize messages in relation to amount of usage being used since last billing date, predefined patterns for the SIM card in the SIM card slot 903*a* is "You still have [x]MB left in your monthly usage", and for the SIM card in the SIM card slot 903*b* is "You have already used [x]MB in your monthly usage", where "[x]" can be any number. The predefined patterns allowed to be used for one SIM card are selected based on one or a combination of complete International Mobile Subscriber Identity (IMSI), mobile network code (MCC) part of IMSI, and mobile network code (MNC) part of IMSI. It is preferred that the predefined patterns is selected based on combining of MCC and MNC.

Figure 10:
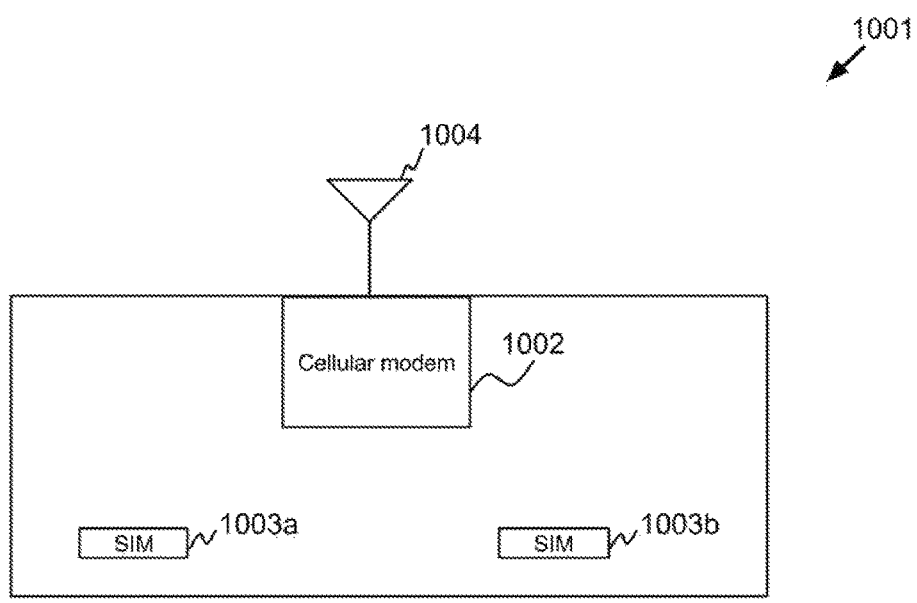
FIG. 10 illustrates a block diagram of a network node according to one of the embodiments of the present invention.

FIG. 10 illustrates network node 1001, a particular type of network node that is comprised of at least one cellular modem 1002, a plurality of SIM card slots 1003 and at least one antenna 1004. Each of cellular modem 1002 is connected to at least one of antenna 1004. For example, IoT device 801 can be network node 1001. Cellular modem 1002 is capable of only using one SIM card at a time. A processing unit of network node 1001, not shown in FIG. 10, determines which of SIM card in SIM card slots 1003 is used by cellular modem 1002. For example, the processing unit may determine that SIM card in SIM card slot 1003*a* is used by cellular modem 1002, and SIM card in SIM card slot 1003*b* is not used unless the SIM card in SIM card slot 1003*a* cannot be used. There are myriads reasons why SIM card in SIM card slot 1003*a* cannot be used. For example, the SIM card in SIM card slot 1003*a* is out of order; roaming charge may be incurred if it is being used; additional charge may be incurred if it is being used after its monthly cap is used up. There is no limitation that the number of SIM card slots in network node 1001 is limited to two. For example, the number of SIM card slots in network node 1001 can be eight that the processing unit may assign any of the eight SIM card slots to cellular modem 1002.

In one variant, cellular modem 1002 uses a remote SIM card, instead of using any SIM card in the SIM card slots 1003. The remote SIM card are located in a different device that is not in the same enclosure of SIM card slots 1003. This further allows processing unit of cellular router 1001 to have more SIM card choices for cellular modem 1002.

Figure 11:
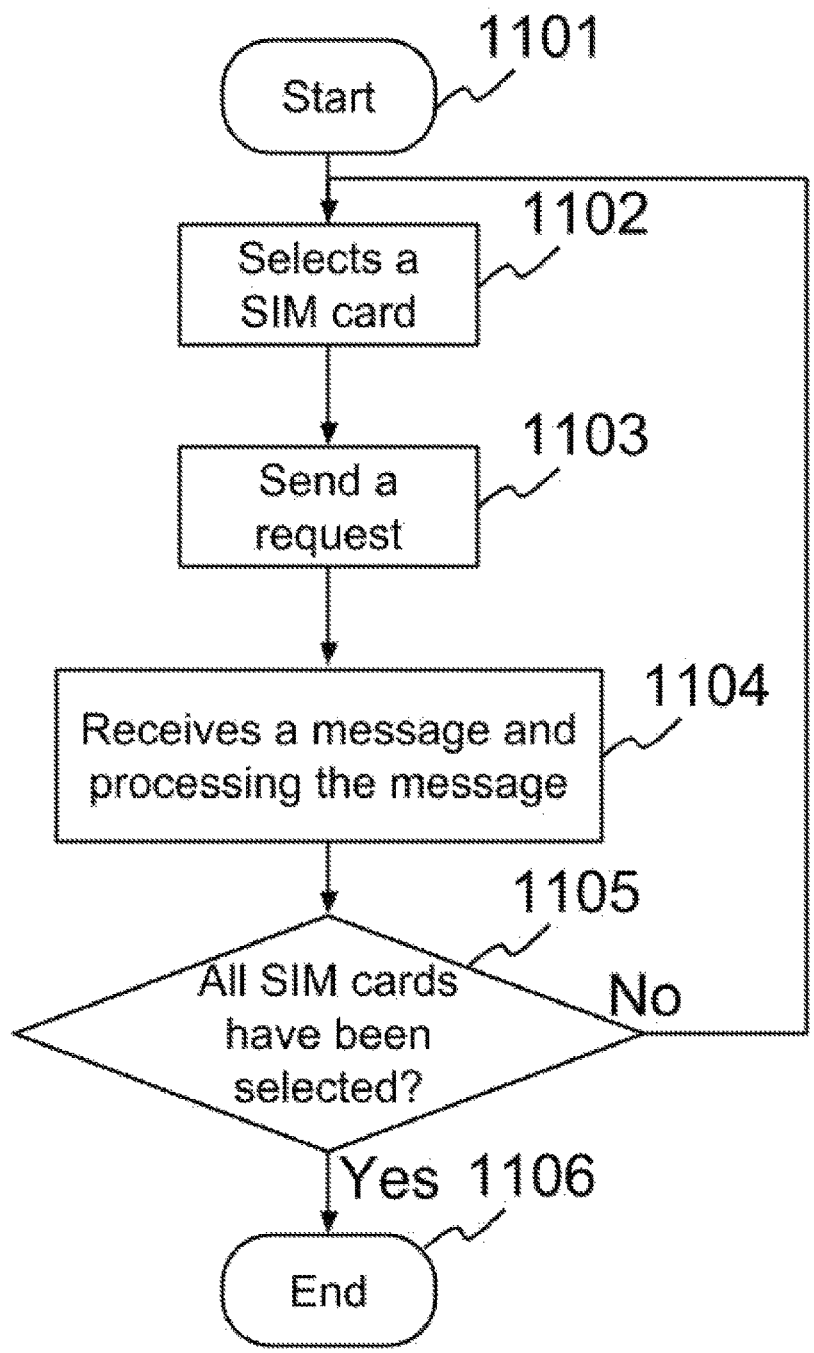
FIG. 11 is a flowchart illustrating a process according to one of the embodiments of the present invention.

FIG. 11 is a flowchart illustrating a process according to some of embodiments of the present invention. The process is applicable to network nodes 901 and 1001 as both have a plurality of SIM card slots that are applicable of holding SIM cards. The process starts at step 1101. At step 1102, processing unit of the network node selects one of SIM cards that is in one of SIM card slots. At step 1103, the processing unit sends a message through a cellular modem, which uses the selected SIM card, to a wireless communication service provider. The wireless communication service provider is preferred to be a wireless communication service provider associated with the SIM card. If the message is sent to a non-associated wireless communication service provider, the non-associated wireless communication service provider may not respond the message or respond with information that may not be comprehensible by the SIM card, cellular modem or processing unit of the network node.

The request can be a message sent through a data connection, a SMS message or an Unstructured Supplementary Service Data (USSD) code/message. In one example, in order to check data usage, the request is USSD code with "*3282#".

At step 1104, when a message is received from the service provider, the message is processed according to the embodiments herein. At step 1105, processing unit of the network node will select another SIM card for steps 1102 to 1104 unless all SIM cards are selected. This allows status of all SIM cards been retrieved or updated. For example, an administrator of the network node wants to know data usage of each SIM card, processing unit of will have the data usage after performing steps 1101 to 1106. In one variant, step 1105 is modified to determine whether all SIM cards of a predefined list of SIM cards have been selected. By limiting to only a predefined list of SIM cards reduces the time required to receive all messages. There is no limitation to the number of SIM cards in the SIM cards list. For example, there may be one, five, or twenty SIM cards in the SIM cards list.

In one variant, instead of selecting a SIM card, processing unit may select a SIM card slot as one SIM card slot is used to hold one SIM card only. When a SIM card slot is selected by the processing unit, the processing unit is also selecting the SIM card, which is held by the SIM card slot.

In one variant, the messages received at step 1104 is sent to the management server 104 for further processing.

Figure 12:
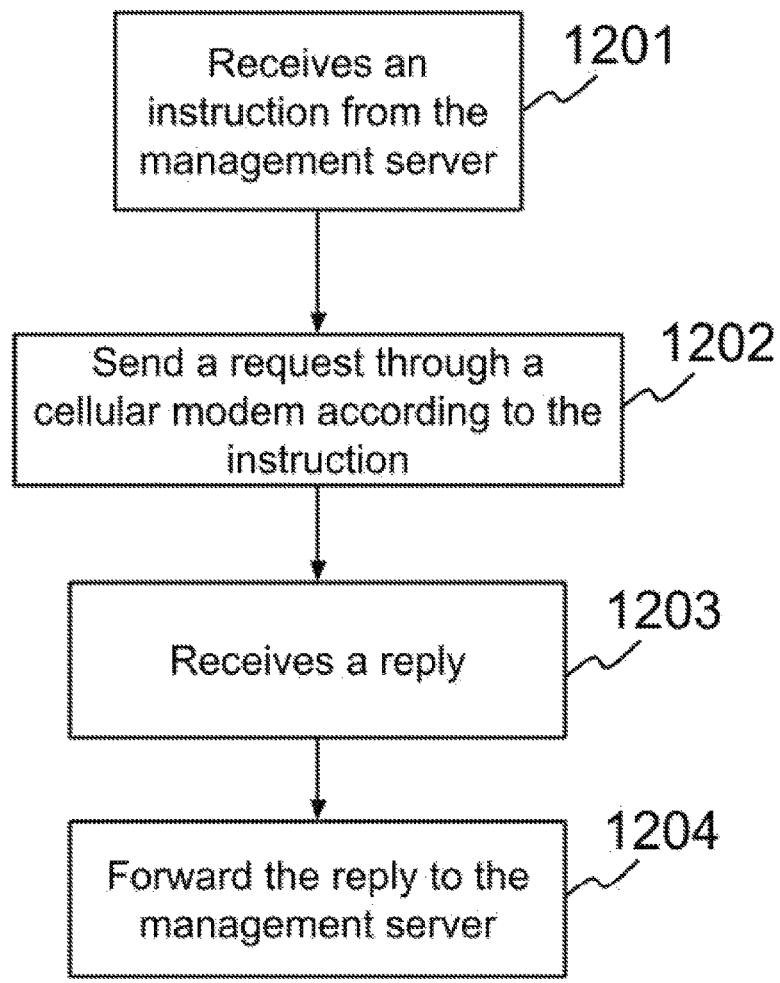
FIG. 12 is a flowchart illustrating a process according to one of the embodiments of the present invention.

FIG. 12 is a flowchart illustrating a process according to some of embodiments of the present invention. The process is applicable to network nodes 901 and 1001 as both have a plurality of SIM card slots that are capable of holding SIM cards. The process illustrated in FIG. 12 allows management server 104 to receive message from a wireless communication service provider through the network node, particularly the message can only be or much quicker to be received the network node.

At step 1201, the network node receives an instruction from management server 104. The instructions may be received through a data connection using a wireless data connection, such as SMS, cellular data connection and WLAN data connection, or wired data connection, such as Ethernet data connection. When network node is able to recognize the instruction, network node will send a request through a cellular modem using the SIM card or SIM card slot specified according to the instruction at step 1202. As the network node may have a plurality of cellular modem and a plurality of SIM card lots with SIM cards inserted, the instruction includes criteria to select a SIM card/SIM card slot or identity of the SIM card/SIM card slot. The request also includes the message to be sent along with the request or an instruction for processing unit to create the request.

At step 1203, the network node receives a reply from the service provider. At step 1204, the network node forwards the reply to management server 104 through a wireless data connection, SMS, or a wireless data connection. In one variant, between step 1203 and 1204, network node will process the reply first in order to determine the validity of the reply and/or to determine if the reply contains information requested. If the reply is invalid and/or the reply does not contain information requested, step 1204 will not be performed.

There is no limitation that embodiments with SIM card slots must have the slot accessible to a user. For example, the SIM card slots may not be accessible to a user unless the user opens or destroys the enclosure of the cellular router. SIM card that already placed at a SIM card slot may or may not be removed from the SIM card slot.

The invention claimed is:

1. A method for processing messages at a network node, wherein the network node is comprised of at least one cellular modem and a plurality of subscriber identity module (SIM) card slots, and wherein each of the plurality of SIM card slots is configured to hold a SIM card, comprising: (a) selecting a SIM card; (b) associated with the SIM card selected at (a); (c) receiving a message, wherein the message is originated from a device operated by the wireless network service provider; (d) determining whether the message matches any pre-defined pattern; wherein step (d) is performed by performing a lookup on a first configuration database; wherein the first configuration database comprises a plurality of pre-defined patterns; wherein the message is one of, short messaging service (SMS) message, a multimedia messaging service (MMS) message, or an email message; wherein when the message is one of, a SMS message or an email message, the pre-defined pattern is set by defining a character string; wherein when the message is a MMS message, the pre-defined pattern is set by defining an image, audio, video or a combination of image, audio and/or video; and wherein the plurality of predefined patterns is selected from a group consisting of: a first predefined pattern indicating that a bandwidth cap of a connection through the SIM card is approaching a threshold, and a second predefined pattern indicating that the SIM card needs to be recharged; and (e) processing the message if the message matches any pre-defined pattern.

2. The method according to claim 1, wherein the first configuration database is updated after receiving information from the management server.

3. The method according to claim 1, wherein the request is a SMS message.

4. The method according to claim 1, wherein the request is an Unstructured Supplementary Service Data (USSD) code.

5. The method according to claim 1, further comprising:
(f) forwarding the message to a management server after performing step (c).

6. The method according to claim 1, further comprising:
(g) sending a reply to a management server after performing step (c), wherein the reply is based on the message.

7. The method according to claim 1, wherein steps (a) to (d) are repeated until all SIM cards have been selected.

8. The method according to claim 1, wherein the request is based on an instruction received from a management server.

9. A network node for processing messages comprising: at least one cellular modem; at least one processing unit; at least one main memory; a plurality of SIM card slots; at least one secondary non-transitory computer readable storage media storing program instructions executable by the at least one processing unit for: (a) selecting a SIM card; (b) sending a request to a wireless network service provider associated with the SIM card selected at (a); (c) receiving a message, wherein the message is originated from a device operated by the wireless network service provider; (d) determining whether the message matches any pre-defined pattern;

wherein step (d) is performed by performing a lookup on a first configuration database; wherein the first configuration database comprises a plurality of pre-defined patterns; wherein the message is one of, a short messaging service (SMS) message, a multimedia messaging service (MMS) message, or an email message; wherein when the message is one of, a SMS message or an email message, the pre-defined pattern is set by defining a character string; wherein when the message is a MMS message, the pre-defined pattern is set by defining an image, audio, video or a combination of image, audio and/or video; and wherein the plurality of predefined patterns is selected from a group consisting of: a first predefined pattern indicating that a bandwidth cap of a connection through the SIM card is approaching a threshold, and a second predefined pattern indicating that the SIM card needs to be recharged; and (e) processing the message if the message matches any pre-defined pattern.

10. The network node of claim 9, wherein the first configuration database is updated after receiving information from the management server.

11. The network node of claim 9, wherein the request is a SMS message.

12. The network node of claim 9, wherein the request is an Unstructured Supplementary Service Data (USSD) code.

13. The network node of claim 9, wherein after performing steps (c) and (f), at least one secondary non-transitory computer readable storage media storing program instructions further stores program instructions for forwarding the message to a management server.

14. The network node of claim 9, wherein after performing steps (c) and (g), at least one secondary non-transitory computer readable storage media storing program instructions further stores program instructions for sending a reply to a management server, wherein the reply is based on the message.

15. The network node of claim 9, wherein steps (a) to (d) are repeated until all SIM cards have been selected.

16. The network node of claim 9, wherein the request is based on an instruction received from a management server.

* * * * *